(12) United States Patent
Takashi et al.

(10) Patent No.: US 10,940,898 B2
(45) Date of Patent: Mar. 9, 2021

(54) VEHICLE COMPOSITE MEMBER, VEHICLE, VEHICLE MANUFACTURING METHOD, AND MIXED FLOW PRODUCTION METHOD

(71) Applicant: TOYOTA JIDOSHA KABUSHIKI KAISHA, Toyota (JP)

(72) Inventors: Toshinobu Takashi, Nisshin (JP); Takuya Oshima, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 16/181,401

(22) Filed: Nov. 6, 2018

(65) Prior Publication Data

US 2019/0176904 A1   Jun. 13, 2019

(30) Foreign Application Priority Data

Dec. 8, 2017   (JP) .............................. JP2017-236493

(51) Int. Cl.
| | |
|---|---|
| *B62D 29/00* | (2006.01) |
| *B23K 11/11* | (2006.01) |
| *B62D 65/02* | (2006.01) |
| *B62D 25/20* | (2006.01) |
| *B23K 11/00* | (2006.01) |
| *B62D 25/08* | (2006.01) |
| *B23K 11/16* | (2006.01) |
| *B23K 11/31* | (2006.01) |
| *B23K 101/00* | (2006.01) |

(Continued)

(52) U.S. Cl.
CPC ........ *B62D 29/008* (2013.01); *B23K 11/0026* (2013.01); *B23K 11/11* (2013.01); *B23K 11/115* (2013.01); *B23K 11/16* (2013.01); *B23K 11/314* (2013.01); *B62D 25/087* (2013.01); *B62D 25/2027* (2013.01); *B62D 25/2045* (2013.01); *B62D 65/024* (2013.01); *B23K 2101/006* (2018.08); *B23K 2101/18* (2018.08); *B23K 2103/02* (2018.08)

(58) Field of Classification Search
CPC ................ B62D 29/008; B62D 25/087; B62D 25/2027; B62D 25/2045; B62D 65/024; B23K 11/0026; B23K 11/11; B23K 11/115; B23K 11/16; B23K 11/314
USPC .................. 296/193.01, 193.04, 193.08, 191
See application file for complete search history.

(56) References Cited

U.S. PATENT DOCUMENTS

| | | | |
|---|---|---|---|
| 8,184,847 B2 * | 5/2012 | Bertoli ................... | H04R 1/025 381/389 |
| 8,641,133 B1 * | 2/2014 | Scaringe .............. | B62D 29/008 296/193.03 |

(Continued)

FOREIGN PATENT DOCUMENTS

| | | |
|---|---|---|
| JP | 2014-80064 | 5/2014 |
| JP | 2017-43129 | 3/2017 |

*Primary Examiner* — Joseph D. Pape
(74) *Attorney, Agent, or Firm* — Oblon, McClelland, Maier & Neustadt, L.L.P.

(57) ABSTRACT

A vehicle composite member to be joined at a perimeter section to a ferrous vehicle body member is provided. The vehicle composite member includes a lightweight panel that is formed of a lightweight material having a lighter specific weight than iron, and a ferrous perimeter member that has been integrated with the lightweight panel. The perimeter section is configured by the ferrous perimeter member.

14 Claims, 5 Drawing Sheets

(51) Int. Cl.
B23K 103/02 (2006.01)
B23K 101/18 (2006.01)

(56) References Cited

U.S. PATENT DOCUMENTS

| | | |
|---|---|---|
| 9,701,250 B1 | 7/2017 | Ranga et al. |
| 9,840,202 B1 * | 12/2017 | Ranga ................. B60R 11/0223 |
| 2006/0119140 A1 * | 6/2006 | Yamazaki .............. B62D 25/08 |
| | | 296/203.04 |

* cited by examiner

VEHICLE COMPOSITE MEMBER, VEHICLE, VEHICLE MANUFACTURING METHOD, AND MIXED FLOW PRODUCTION METHOD

CROSS-REFERENCE TO RELATED APPLICATIONS

This application claims priority under 35 USC 119 from Japanese Patent application No. 2017-236493 filed on Dec. 8, 2017, the disclosure of which is incorporated by reference herein in its entirety.

BACKGROUND

Technical Field

The present disclosure relates to a vehicle composite member, a vehicle, a vehicle manufacturing method, and a mixed flow production method.

Related Art

Japanese Patent Application Laid-Open (JP-A) No. 2014-80064 discloses a rear package tray (upper back), which is a composite member in which a center panel made of aluminum (aluminum alloy) and a side-and-rear panel made of ferrous metal (steel) are integrated together.

However, in the above-described technology, since there is no ferrous member provided at a front section of the upper back, there is a possibility of the center panel being damaged by a collision load from the vehicle front side.

Moreover, since the front section of the upper back is not configured by a ferrous member, aluminum and ferrous metal need to be joined together when joining the front section of the upper back to a ferrous vehicle body (body). This requires equipment for joining different materials together, resulting in problems with production costs and production efficiency.

SUMMARY

The present disclosure has been arrived at in consideration of the above circumstances. Namely, the present disclosure provides a vehicle composite member, a vehicle, a vehicle manufacturing method, and a mixed flow production method capable of suppressing damage to a lightweight panel due to collision load, and capable of curbing production costs and improving production efficiency.

Vehicle Composite Member

A vehicle composite member according to a first aspect is to be joined to a ferrous vehicle body member at a perimeter section. The vehicle composite member includes a lightweight panel that is formed of a lightweight material having a lighter specific weight than iron, and a ferrous perimeter member has been integrated with the lightweight panel. The perimeter section is configured by the ferrous perimeter member.

The vehicle composite member according to the first aspect includes the lightweight panel formed of a lightweight material having a lighter specific weight than iron. This enables a vehicle to be made lighter in weight than if employing a vehicle member configured only of ferrous metal members. Moreover, the perimeter section to be joined to the ferrous vehicle body member is configured by the ferrous perimeter member, thereby enabling the join between the vehicle composite member and the ferrous vehicle body member to be a ferrous metal-on-ferrous metal join. This obviates the need for equipment to join different materials when joining the vehicle composite member and the ferrous vehicle body member together.

A vehicle composite member according to a second aspect is the vehicle composite member according to the first aspect, wherein the ferrous perimeter member includes plural mutually separate members, and the perimeter section is configured by the plural members.

In the vehicle composite member according to the second aspect, the ferrous perimeter member includes the plural mutually separate members, and the perimeter section of the vehicle composite member is configured by the plural members. This facilitates manufacturing of the vehicle composite member.

A vehicle composite member according to a third aspect is the vehicle composite member according to the first or the second aspect, wherein a step is provided at a front portion of the vehicle composite member, and the step is configured by the ferrous perimeter member.

In the vehicle composite member according to the third aspect, the step at the front portion of the vehicle composite member is configured by the ferrous perimeter member. This obviates the need to form a step in the lightweight panel, and so the center panel is easy to form.

A vehicle composite member according to a fourth aspect is the vehicle composite member according to any one of the first to the third aspect, wherein the vehicle composite member is an upper back small sub-assembly configuring an upper back section of a vehicle.

In the vehicle composite member according to the fourth aspect, the vehicle composite member is applied to the upper back section of the vehicle. Making the upper back section lighter in weight enables the vehicle to also be made lighter in weight.

Vehicle

A vehicle according to a fifth aspect includes a ferrous vehicle body member, and a composite member that is joined to the ferrous vehicle body member at a perimeter section. The composite member includes a lightweight panel formed of a lightweight material having a lighter specific weight than iron, and a ferrous perimeter member that has been integrated with the lightweight panel. The perimeter section is configured by the ferrous perimeter member.

In the vehicle according to the fifth aspect, the vehicle can be made lighter in weight by employing the composite member including the lightweight panel formed of a lightweight material having a lighter specific weight than iron. Moreover, the ferrous perimeter member configures the perimeter section of the composite member, thereby enabling the lightweight panel to be protected from damage due to load in a collision or the like.

A vehicle according to a sixth aspect is the vehicle according to the fifth aspect, wherein the ferrous perimeter member includes plural mutually separate members, and the perimeter section is configured by the plural members.

In the vehicle according to the sixth aspect, the ferrous perimeter member is configured including the plural mutually separate members, and the perimeter section of the vehicle composite member is configured by the plural members. This facilitates manufacturing of the vehicle composite member.

A vehicle according to a seventh aspect is the vehicle according to the fifth or the sixth aspect, wherein a step is provided at a front portion of the composite member, and the step is configured by the ferrous perimeter member.

In the vehicle according to the seventh aspect, the step at the front portion of the vehicle composite member is configured by the ferrous perimeter member. This obviates the need to form a step in the lightweight panel, and so the center panel is easy to form.

A vehicle according to an eighth aspect is the vehicle according to any one of the fifth to the seventh aspect, wherein the ferrous vehicle body member includes a left and right pair of side members configuring side sections of the vehicle.

In the vehicle according to the eighth aspect, the composite member is joined to the ferrous vehicle body member including the left and right pair of side members. This enables the lightweight panel to be employed in the wide area between the left and right pair of side members. This enables the vehicle to be made even lighter in weight.

A vehicle according to a ninth aspect is the vehicle according to the eighth aspect, wherein the composite member configures an upper back section of the vehicle.

In the vehicle according to the ninth aspect, the vehicle composite member is applied to the upper back section of the vehicle. This enables the vehicle to be made lighter in weight by making the upper back section lighter in weight.

Vehicle Manufacturing Method

A vehicle manufacturing method according to a tenth aspect includes a joining process of joining a perimeter section of a vehicle composite member to a ferrous vehicle body member. The vehicle composite member includes a lightweight panel that is formed of a lightweight material having a lighter specific weight than iron, and a ferrous perimeter member that has been integrated with the lightweight panel. The perimeter section is configured by the ferrous perimeter member.

In the vehicle manufacturing method according to the tenth aspect, the vehicle composite member includes the lightweight panel that is formed of a lightweight material having a lighter specific weight than iron. This enables a vehicle to be made lighter in weight than in cases in which a vehicle member formed entirely of ferrous metal is employed in place of the vehicle composite member. Moreover, the perimeter section to be joined to the ferrous vehicle body member is configured by the ferrous perimeter member, thereby enabling the join between the vehicle composite member and the ferrous vehicle body member to be a ferrous metal-on-ferrous metal join. This obviates the need for equipment to join different materials when joining the vehicle composite member and the ferrous vehicle body member together.

A vehicle manufacturing method according to an eleventh aspect is the vehicle manufacturing method according to the tenth aspect, wherein the joining process is performed on the same production line as another joining process to join a vehicle ferrous member, which configures the same portion of a vehicle as the vehicle composite member and is formed entirely of ferrous metal, to a different ferrous vehicle body member from the ferrous vehicle body member that is joined to the vehicle composite member.

In the vehicle manufacturing method according to the eleventh aspect, the process of joining the vehicle composite member to the ferrous vehicle body member is performed on the same production line as the process to join the vehicle ferrous member and the different ferrous vehicle body member. This obviates the need to increase the number of production lines.

A vehicle manufacturing method according to a twelfth aspect is the vehicle manufacturing method according to the tenth or the eleventh aspect, wherein the ferrous vehicle body member that is joined to the vehicle composite member includes a left and right pair of side members configuring side sections of the vehicle.

In the vehicle manufacturing method according to the twelfth aspect, the composite member is joined to the ferrous vehicle body member including the left and right pair of side members. This enables the lightweight panel to be employed in the wide area between the left and right pair of side members. This enables the vehicle to be made even lighter in weight.

A vehicle manufacturing method according to a thirteenth aspect is the vehicle manufacturing method according to the twelfth aspect, wherein the vehicle composite member is an upper back small sub-assembly configuring an upper back section of a vehicle.

In the vehicle manufacturing method according to the thirteenth aspect, the vehicle composite member is applied to the upper back section of the vehicle. This enables the vehicle to be made lighter in weight by making the upper back section lighter in weight.

Mixed Flow Production Method

A mixed flow production method according to a fourteenth aspect is a mixed flow production method including a first joining process of joining a perimeter section of a vehicle ferrous member to a ferrous vehicle body member and a second joining process of joining a perimeter section of a vehicle composite member to a different ferrous vehicle body member from the ferrous vehicle body member joined to the vehicle ferrous member. The vehicle ferrous member is a member configuring the same portion of a vehicle as the vehicle composite member and is formed entirely of ferrous metal. The vehicle composite member is a member including a lightweight panel formed of a lightweight material having a lighter specific weight than iron and a ferrous perimeter member that has been integrated with the lightweight panel. The perimeter section of the vehicle composite member is configured by the ferrous perimeter member. The first joining process and the second joining process are performed on the same production line.

In the mixed flow production method according to the fourteenth aspect, vehicles with the lightweight panel applied to part of the vehicle and vehicles not applied with the lightweight panel can be manufactured on the same production line.

As explained above, the present disclosure enables damage to a lightweight panel due to collision load to be suppressed, and enables production costs to be curbed and production efficiency to be improved.

BRIEF DESCRIPTION OF THE DRAWINGS

Exemplary embodiments of the present disclosure will be described in detail based on the following figures, wherein.

DETAILED DESCRIPTION

Explanation follows regarding an exemplary embodiment of the present disclosure, with reference to FIG. 1A to FIG. 3.

Upper Back Small Sub Assembly

Figure 1A:
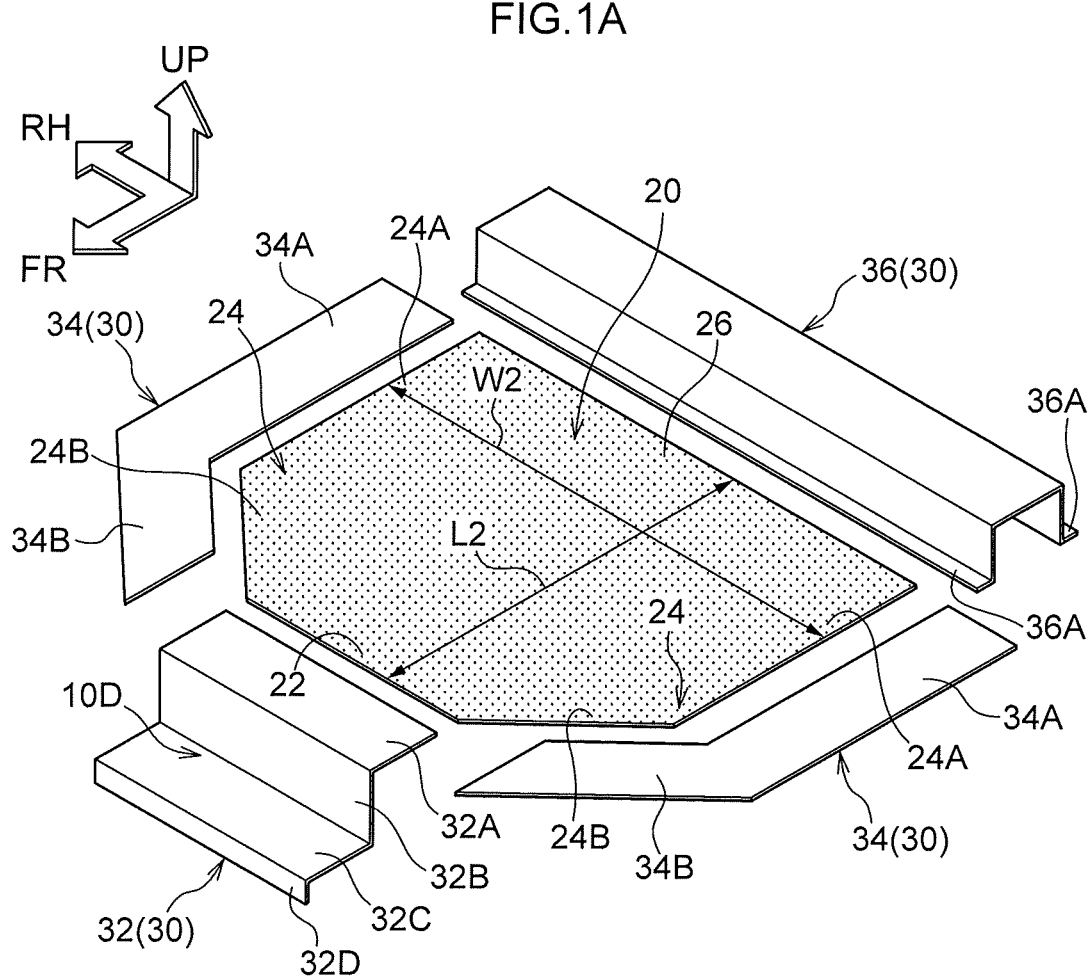
FIG. 1A is an exploded perspective view of an upper back small SA serving as a vehicle composite member.
Figure 1B:
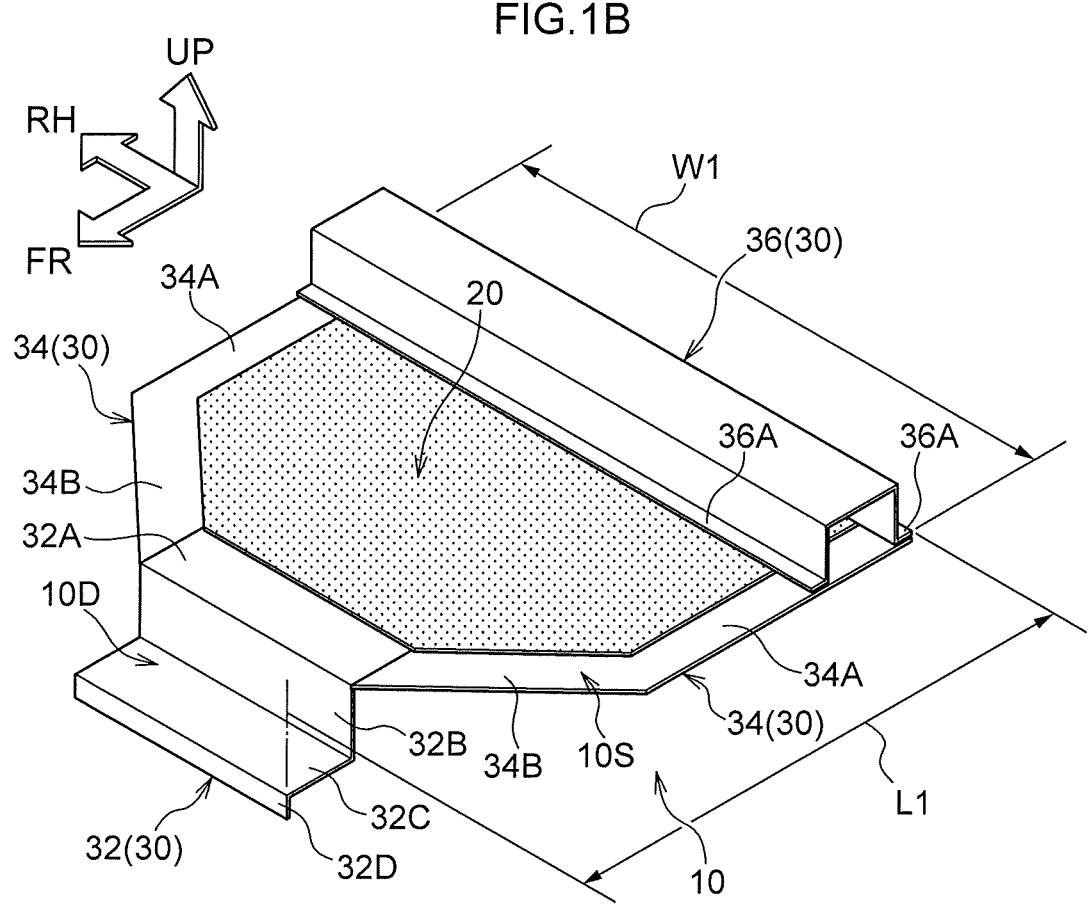
FIG. 1B is a perspective view of an upper back small SA serving as a vehicle composite member.

First, explanation follows regarding an upper back small sub assembly (hereafter referred to as an upper back small SA) 10, in which a vehicle composite member of the present disclosure is applied to an upper back section of a vehicle, with reference to FIG. 1A and FIG. 1B. FIG. 1A is an exploded perspective view of the upper back small SA 10 (corresponding to a state prior to being joined together), and FIG. 1B is a perspective view of the upper back small SA 10 (corresponding to a completed state after being joined together).

The upper back small SA 10 configures an upper back section of a vehicle, and is a member that partitions a luggage compartment at the vehicle rear from a vehicle cabin (passenger cabin) such that one is above the other. The upper back section configures an upper wall of the luggage compartment. A rear windshield, not illustrated in the drawings, is positioned above the upper back section of the vehicle.

The upper back small SA 10 is configured including a center panel 20 made of aluminum (aluminum alloy) and serving as a lightweight panel, and a ferrous perimeter member 30 formed of an iron-based material (hereafter simply referred to as ferrous metal). The ferrous perimeter member 30 and the center panel 20 are joined together to form a single unit, thereby forming the upper back small SA 10. The ferrous perimeter member 30 is configured by a front member 32, a left and right pair of side members 34, and a rear member 36.

As illustrated in FIG. 1B, the center panel 20 configures a center section over a wide range of the upper back small SA 10. For example, a width dimension W2 (see FIG. 1A) of the center panel 20 is no less than 70% (more preferably no less than 80%) of a width dimension W1 (see FIG. 1B) of the upper back small SA 10. A front-rear dimension L2 of the center panel 20 is no less than 60% (more preferably no less than 70%) of a front-rear dimension L1 of the upper back small SA 10. Although not illustrated in the drawings, various undulating patterns are formed on the center panel 20. However, the plate thickness direction of the center panel 20 is oriented in the vertical direction overall.

The center panel 20 includes a front join portion 22 that is joined to the front member 32. The front join portion 22 is formed at a front end of the center panel 20. The front join portion 22 extends along the width direction.

The center panel 20 also includes a left and right pair of lateral join portions 24 that are joined to the side members 34. The lateral join portions 24 are respectively formed at both width direction ends of the center panel 20. Each lateral join portion 24 is configured including an inclined portion 24B configuring a front portion thereof, and a main portion 24A configuring a rear portion thereof. The inclined portions 24B of the lateral join portion 24 are formed at the width direction outer sides of the front join portion 22, and are portions where the width dimension of the center panel 20 gradually increases on progression rearward. The main portions 24A of the lateral join portions 24 are portions that extend along the front-rear direction.

The center panel 20 also includes a rear join portion 26 that is joined to the rear member 36. The rear join portion 26 is formed at a rear end of the center panel 20. The rear join portion 26 extends along the width direction. A width direction length of the rear join portion 26 is longer than a width direction length of the front join portion 22.

The front member 32 is a member extending along the width direction with a substantially uniform cross-section profile. The front member 32 is configured including a join portion 32A that is joined to the center panel 20, a vertical plate 32B that extends downward from a front end of the join portion 32A, a bottom plate 32C that extends forward from a lower end of the vertical plate 32B, and a front plate 32D that extends a short distance downward from a front end of the bottom plate 32C.

The side members 34 are each formed by pressing a sheet material. The plate thickness direction of each side member 34 is oriented in substantially the vertical direction. Each side member 34 is configured by a main portion 34A that is joined to the main portion 24A of the respective lateral join portion 24 of the center panel 20, and an inclined portion 34B that is joined to the inclined portion 24B of the respective lateral join portion 24 of the center panel 20. The length direction of the main portion 34A of the side member 34 is oriented in the front-rear direction, and the length direction of the inclined portion 34B of the side member 34 is oriented at an angle with respect to the front-rear direction.

The rear member 36 is formed by pressing a sheet material. The rear member 36 extends along the width direction with a substantially uniform downward-opening hat-shaped cross-section structure. A front and rear pair of flanges 36A, 36A of the rear member 36 are joined to the center panel 20 and to the side members 34. A closed cross-section structure extending along the width direction is formed by the rear member 36, the center panel 20, and the side members 34.

As illustrated in FIG. 1B, in the upper back small SA 10, the circumference of the center panel 20 is in a state enclosed by the front member 32, the pair of side members 34, and the rear member 36, all of which are formed of ferrous metal. A perimeter section 10S of the upper back small SA 10 is thereby configured by the ferrous perimeter member 30.

Small Sub Assembly Process

The upper back small SA 10 is manufactured by a small sub assembly process (hereafter referred to as a small SA process). The small SA process is performed at a different location to a main production line 50 where a main body process, described below, is performed. The small SA process may be outsourced to a different maker than the maker performing the main body process.

There is no particular limitation to the method of joining the center panel 20 and the ferrous perimeter member 30 together in the small SA process, which may be a joining method other than resistance spot welding, for example. This is because resistance welding between aluminum and ferrous metal does not always obtain sufficient join strength. Examples of specific joining modes include fastening using nuts and bolts, self-piercing rivets, and swage joining by mechanical clinching or the like.

Main Body Process

Figure 2:
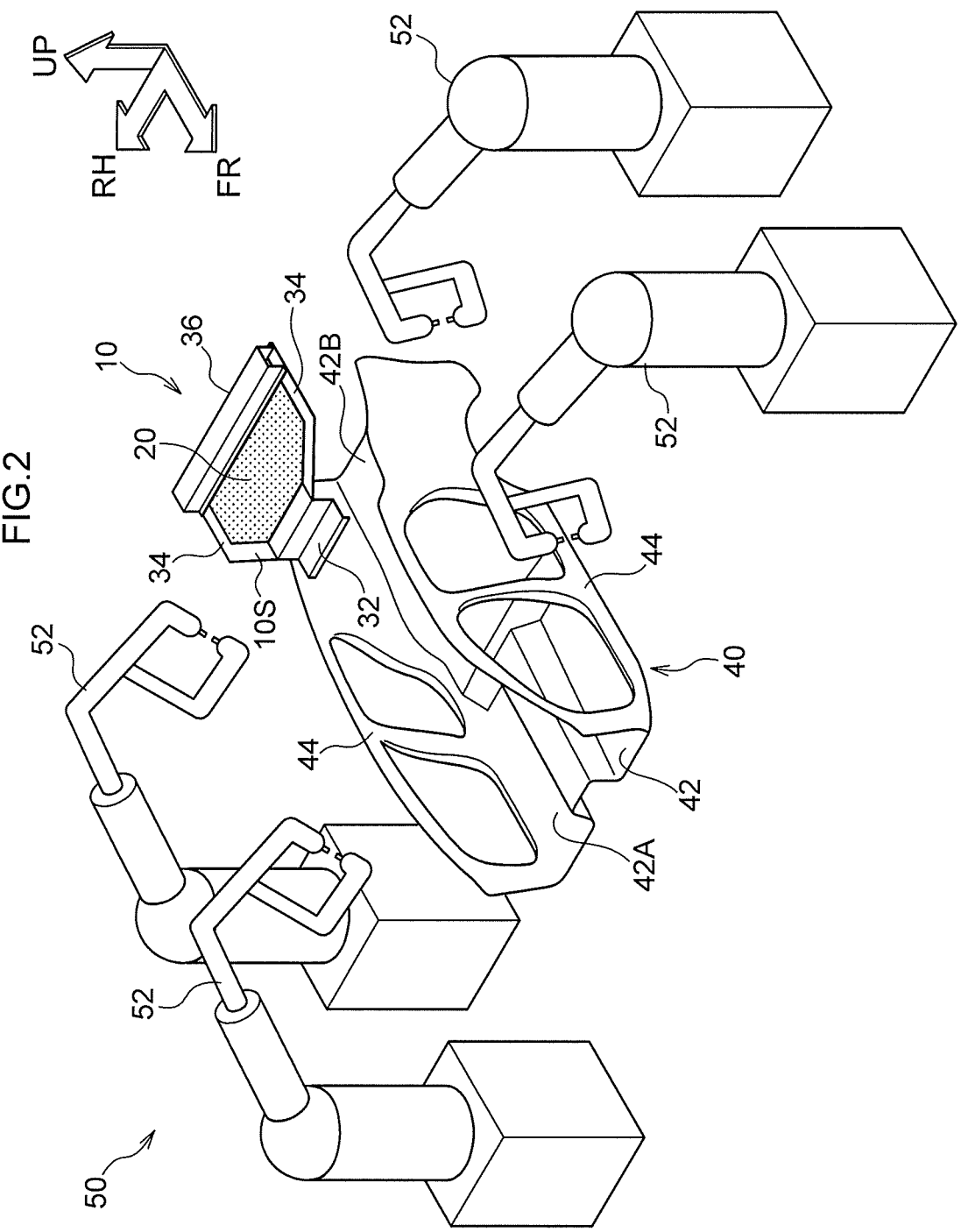
FIG. 2 illustrates an upper back small SA being introduced to a main body process.

Explanation follows regarding the main body process, with reference to FIG. 2.

FIG. 2 illustrates the upper back small SA 10 being introduced to the main production line 50. The main body process is a process in which resistance spot welding is performed multiple times to complete a main body. The main body process is performed on the main production line 50. Multiple robots 52 are disposed on the main production line 50. Resistance spot welding is performed multiple times by the multiple robots 52 while bodies are continually conveyed along the main production line 50.

The upper back small SA 10 is introduced into a body 40 (a body in an incomplete state) formed by joining a left and right pair of side members 44 to an underbody 42.

Specifically, the pair of side members 34 of the upper back small SA 10 are joined to the side members 44. Both width direction side end portions of the rear member 36 of the upper back small SA 10 are joined to the side members 44, and the rest of the rear member 36 is joined to a lower back panel 42B configuring part of the underbody 42. The front member 32 of the upper back small SA 10 is joined to a floor panel 42A configuring part of the underbody 42.

Portions of the side members 44, the floor panel 42A, and the lower back panel 42B that are joined to the upper back small SA 10 are formed of iron-based material. Namely, in the vehicle, members configuring the periphery of the upper back small SA 10 are formed of iron-based material, and the upper back small SA 10 is welded to these members configured by iron-based material (hereafter referred as ferrous vehicle body members). The process of joining the upper back small SA 10 to the ferrous vehicle body members corresponds to a joining process or a second joining process of the present disclosure.

Mixed Flow Production

Figure 3:
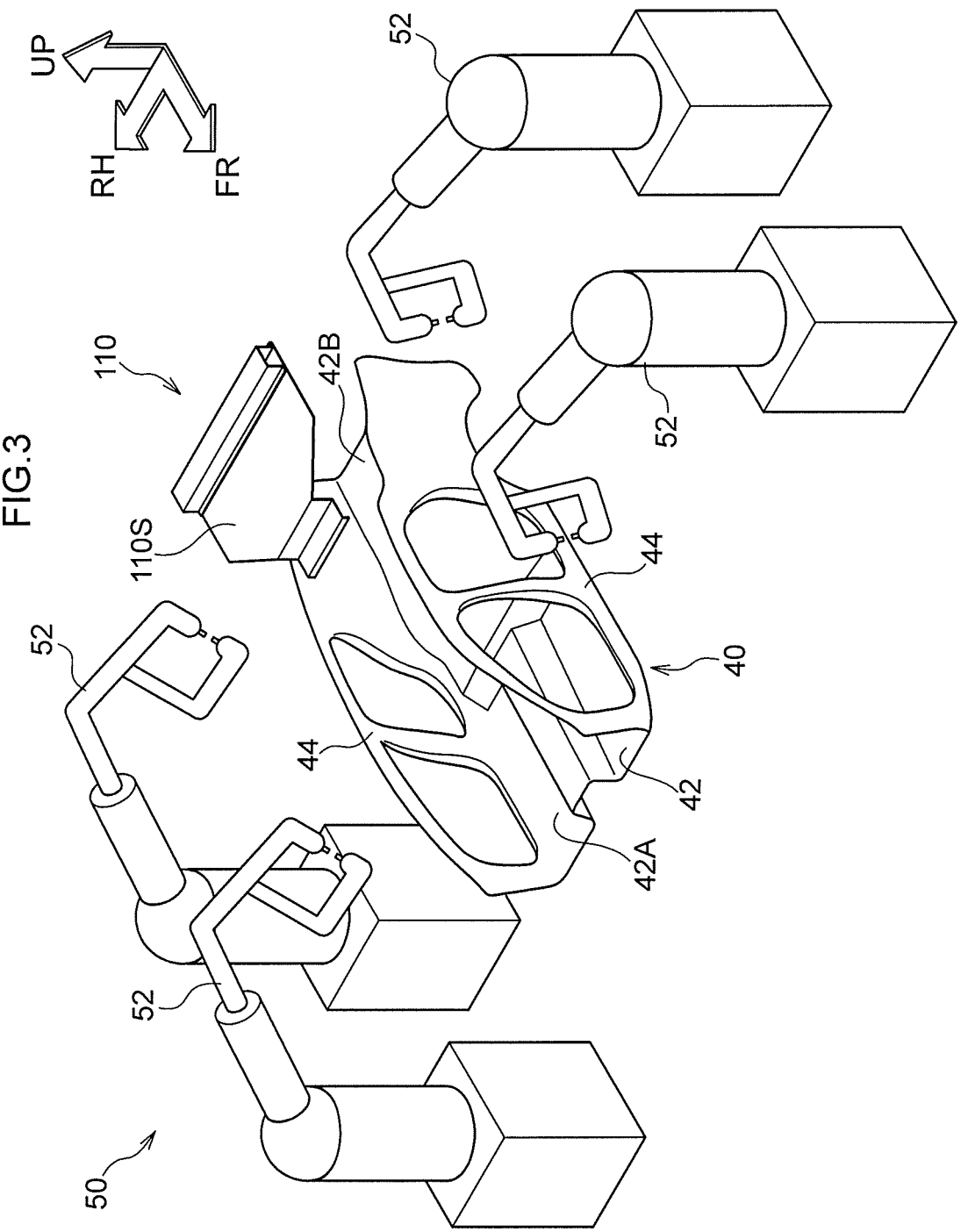
FIG. 3 illustrates an upper back small SA formed entirely of ferrous metal being introduced to a main body process.

FIG. 3 illustrates an upper back small SA 110 that differs from the upper back small SA 10 described above being introduced to the main production line 50. The process illustrated in this drawing is also performed on the main production line 50.

Similarly to the upper back small SA 10 described above, the upper back small SA 110 is also a member configuring an upper back section of a vehicle. However, the upper back small SA 110 is formed of different materials to the upper back small SA 10, being entirely formed of ferrous metal.

Since the upper back small SA 110 is entirely formed of ferrous metal, a perimeter section 110S is naturally also configured by iron-based material. The perimeter section 110S is resistance spot welded to the ferrous vehicle body members (the side members 44 and the floor panel 42A).

Operation and Advantageous Effects

Explanation follows regarding operation and advantageous effects of the present exemplary embodiment.

In the present exemplary embodiment, the upper back small SA 10 includes the center panel 20 serving as a lightweight panel formed of aluminum alloy, this being a lightweight material having a lighter specific weight than iron. This enables the vehicle to be made lighter in weight than when a vehicle member configured only of ferrous members (a vehicle ferrous member, see the upper back small SA 110 illustrated in FIG. 3) is employed. As illustrated in FIG. 1B, the perimeter section 10S joined to the ferrous vehicle body members is configured by the ferrous perimeter member 30. This enables the joins between the upper back small SA 10 and the ferrous vehicle body members (the side members 44 and so on) to be ferrous metal-on-ferrous metal joins. This obviates the need for equipment to join different materials when joining the upper back small SA 10 and the ferrous vehicle body members (the side members 44 and so on) together. Moreover, the ferrous perimeter member 30 configures the perimeter section 10S of the upper back small SA 10, thereby enabling the center panel 20, this being a lightweight panel, to be protected against damage due to load in a collision or the like.

In the present exemplary embodiment, the ferrous perimeter member 30 is configured including plural mutually separate members (specifically, the front member 32, the left and right pair of side members 34, and the rear member 36), and the perimeter section 10S of the upper back small SA 10 is configured by these plural members. This facilitates manufacturing of the upper back small SA 10.

In the present exemplary embodiment, a step 10D (see FIG. 1B) is formed at the front portion of the upper back small SA 10. The step 10D is configured by the ferrous perimeter member 30. This obviates the need to form a step in the center panel 20 formed of lightweight material, and so the center panel 20 is easy to form.

In the present exemplary embodiment, the upper back small SA 10 is applied to the upper back section of the vehicle. Making the upper back section lighter in weight thereby enables the vehicle to be made lighter in weight overall.

In the present exemplary embodiment, the upper back small SA 10 is joined to the ferrous vehicle body members (the side members 44 and so on) including the left and right pair of side members 44. This enables the center panel 20 to be employed in the wide area between the left and right pair of side members 44. This enables the vehicle to be made even lighter in weight.

In the present exemplary embodiment, the upper back small SA 10 is applied to the upper back section of the vehicle. This enables the vehicle to be made lighter in weight by making the upper back section lighter in weight.

In the present exemplary embodiment, the process of joining the upper back small SA 10, this being a ferrous metal-and-aluminum composite member, to the ferrous vehicle body members (the side members 44 and so on) (see FIG. 2), and the process of joining the upper back small SA 110 formed entirely of ferrous metal to the ferrous vehicle body members (the side members 44 and so on) (see FIG. 3) are performed on the same production line, this being the main production line 50. This obviates the need to increase the number of production lines. In other words, vehicles in which the center panel 20 formed of lightweight material is applied to part of the vehicle and vehicles not applied with the center panel 20 can be manufactured on the same production line.

Supplementary Explanation of Exemplary Embodiment

Figure 4:
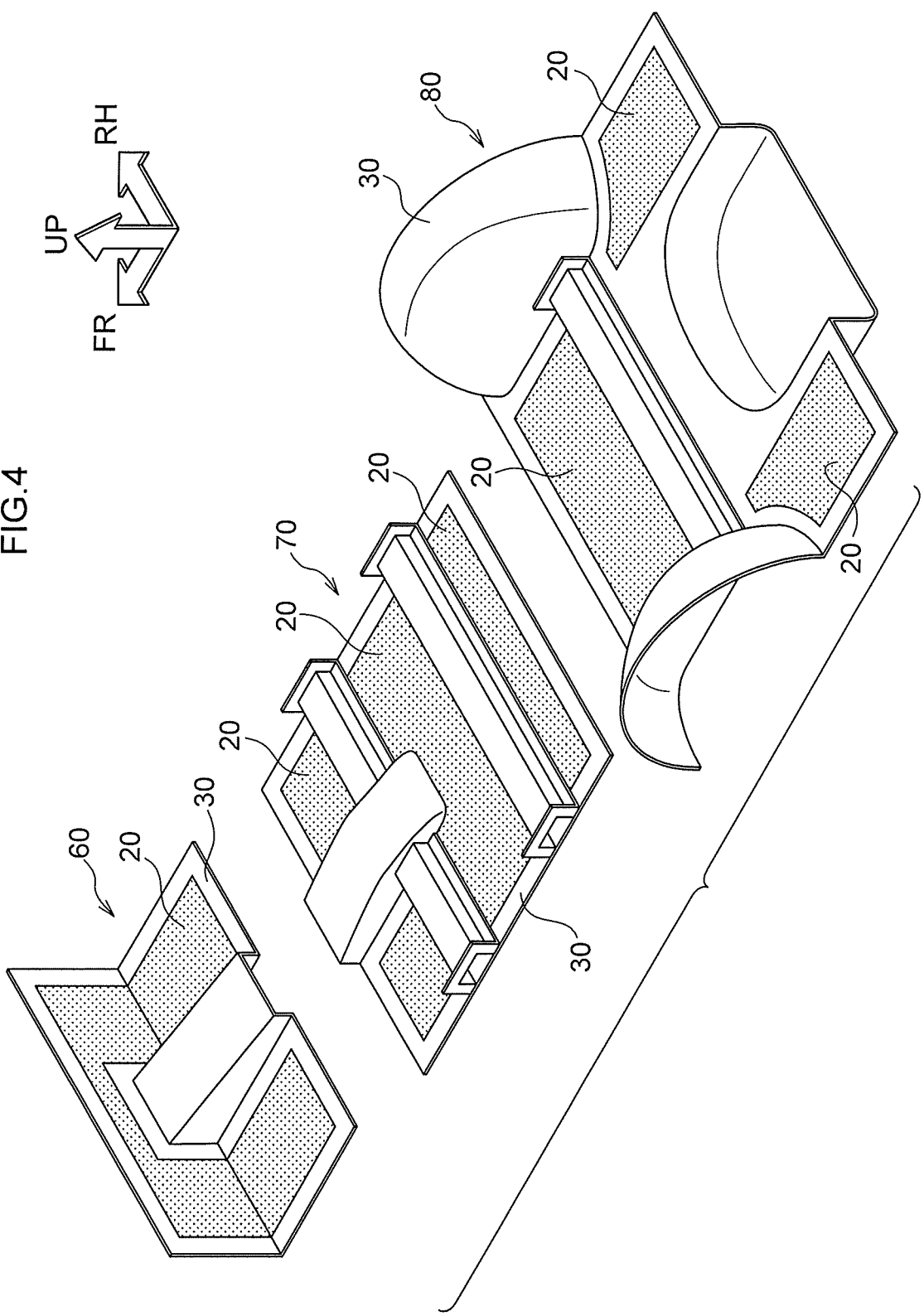
FIG. 4 illustrates another exemplary embodiment of a vehicle composite member.

Note that in the above exemplary embodiment, an example has been given in which the vehicle composite member of the present disclosure is applied to an upper back section. In place of this, as illustrated in FIG. 4, the vehicle composite member may, for example, be configured as a dash panel small SA 60, a floor panel small SA 70, and a lower back small SA 80 respectively applied to a dash section, a floor panel section, and a lower back section.

In such cases, joining may be performed as described below. Namely, the dash panel small SA 60 and the floor panel small SA 70 are welded together at portions of their respective ferrous perimeter members 30, and the floor panel small SA 70 and the lower back small SA 80 are welded together at portions of their respective ferrous perimeter members 30. The dash panel small SA 60, the floor panel small SA 70, and the lower back small SA 80 are also welded to side members 44 at portions of their respective ferrous perimeter members 30 (specifically at both vehicle width direction end portions of the floor panel small SA 70 and the lower back small SA 80).

In the above exemplary embodiment, an example is given in which the center panel 20, serving as a lightweight panel, is formed of aluminum alloy; however, the lightweight panel of the present disclosure is not limited thereto. For example, the material forming the lightweight panel may be carbon (carbon fiber reinforced plastic (CFRP)), or glass fiber reinforced plastic (GFRP).

What is claimed is:

1. A vehicle composite member to be joined to a ferrous vehicle body member at a perimeter section of the vehicle composite member, the vehicle composite member comprising:
 a lightweight panel that is formed of a lightweight material having a lighter specific weight than iron; and
 a ferrous perimeter member that has been integrated with the lightweight panel,
 the perimeter section being configured by the ferrous perimeter member in a state in which a circumference of the lightweight panel is enclosed by the ferrous perimeter member.

2. The vehicle composite member of claim 1, wherein:
 the ferrous perimeter member comprises a plurality of mutually separate members; and
 the perimeter section is configured by the plurality of members.

3. The vehicle composite member of claim 1, wherein:
 a step is provided at a front portion of the vehicle composite member; and
 the step is configured by the ferrous perimeter member.

4. The vehicle composite member of claim 1, wherein the vehicle composite member is an upper back small sub-assembly configuring an upper back section of a vehicle.

5. A vehicle, comprising:
 a ferrous vehicle body member; and
 a composite member that is joined to the ferrous vehicle body member at a perimeter section of the vehicle composite member,
 the composite member including a lightweight panel formed of a lightweight material having a lighter specific weight than iron, and a ferrous perimeter member that has been integrated with the lightweight panel, and
 the perimeter section being configured by the ferrous perimeter member in a state in which a circumference of the lightweight panel is enclosed by the ferrous perimeter member.

6. The vehicle of claim 5, wherein:
 the ferrous perimeter member comprises a plurality of mutually separate members; and
 the perimeter section is configured by the plurality of members.

7. The vehicle of claim 5, wherein:
 a step is provided at a front portion of the composite member; and
 the step is configured by the ferrous perimeter member.

8. The vehicle of claim 5, wherein the ferrous vehicle body member includes a left and right pair of side members configuring side sections of the vehicle.

9. The vehicle of claim 8, wherein the composite member configures an upper back section of the vehicle.

10. A vehicle manufacturing method, comprising:
 a joining process of joining a perimeter section of a vehicle composite member to a ferrous vehicle body member, the vehicle composite member including:
  a lightweight panel that is formed of a lightweight material having a lighter specific weight than iron; and
  a ferrous perimeter member that has been integrated with the lightweight panel,
  the perimeter section being configured by the ferrous perimeter member in a state in which a circumference of the lightweight panel is enclosed by the ferrous perimeter member.

11. The vehicle manufacturing method of claim 10, wherein the joining process is performed on the same production line as another joining process to join a vehicle ferrous member, which configures the same portion of a vehicle as the vehicle composite member and is formed entirely of ferrous metal, to a different ferrous vehicle body member from the ferrous vehicle body member that is joined to the vehicle composite member.

12. The vehicle manufacturing method of claim 10, wherein the ferrous vehicle body member that is joined to the vehicle composite member includes a left and right pair of side members configuring side sections of the vehicle.

13. The vehicle manufacturing method of claim 12, wherein the vehicle composite member is an upper back small sub-assembly configuring an upper back section of a vehicle.

14. A mixed flow production method, comprising:
 a first joining process of joining a perimeter section of a vehicle ferrous member to a ferrous vehicle body member; and
 a second joining process of joining a perimeter section of a vehicle composite member to a different ferrous vehicle body member from the ferrous vehicle body member joined to the vehicle ferrous member,
 the vehicle ferrous member configuring the same portion of a vehicle as the vehicle composite member and being formed entirely of ferrous metal,
 the vehicle composite member being a member including a lightweight panel formed of a lightweight material having a lighter specific weight than iron, and a ferrous perimeter member that has been integrated with the lightweight panel,
 the perimeter section of the vehicle composite member being configured by the ferrous perimeter member in a state in which a circumference of the lightweight panel is enclosed by the ferrous perimeter member, and
 the first joining process and the second joining process being performed on the same production line.

* * * * *